Patented Apr. 10, 1945

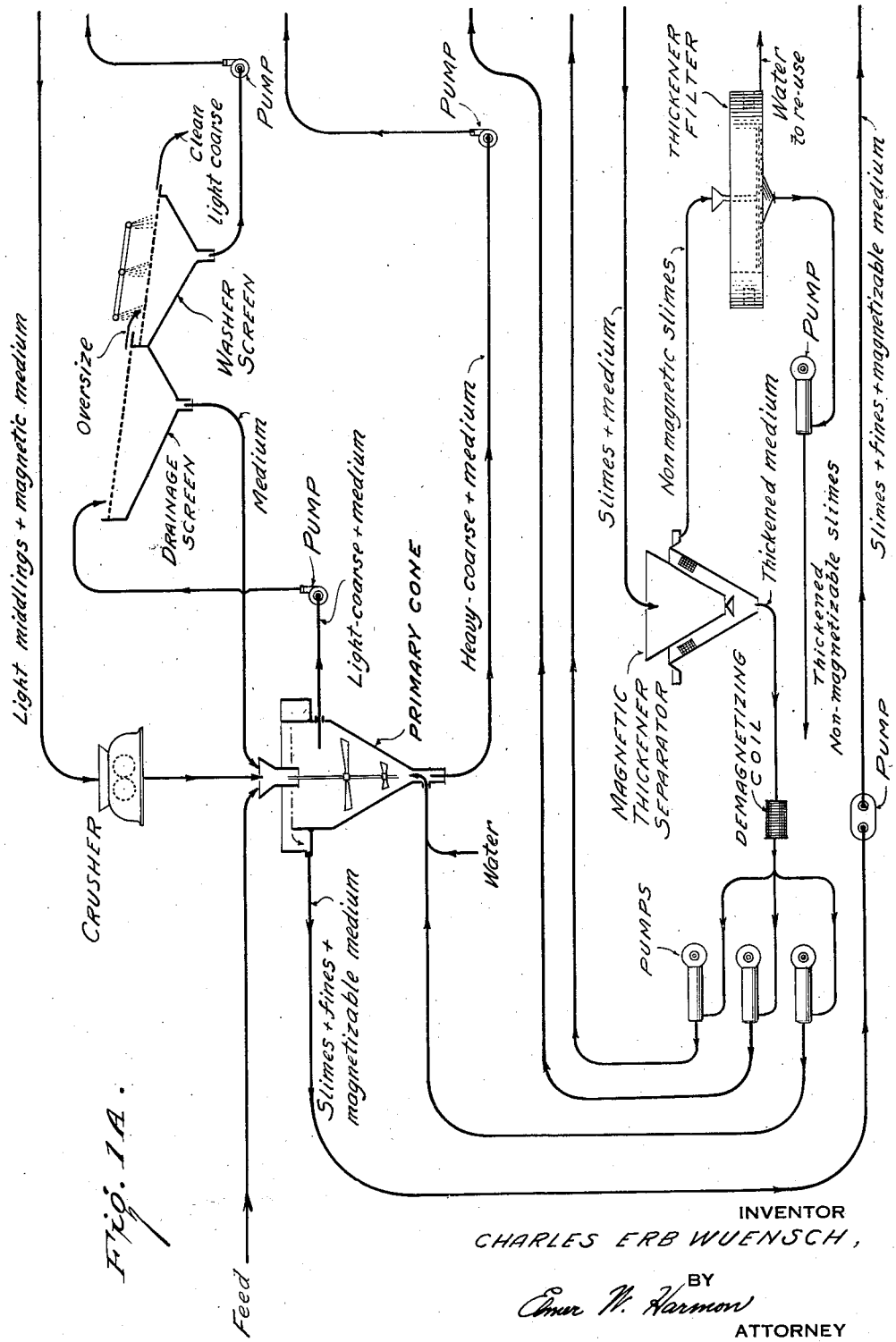

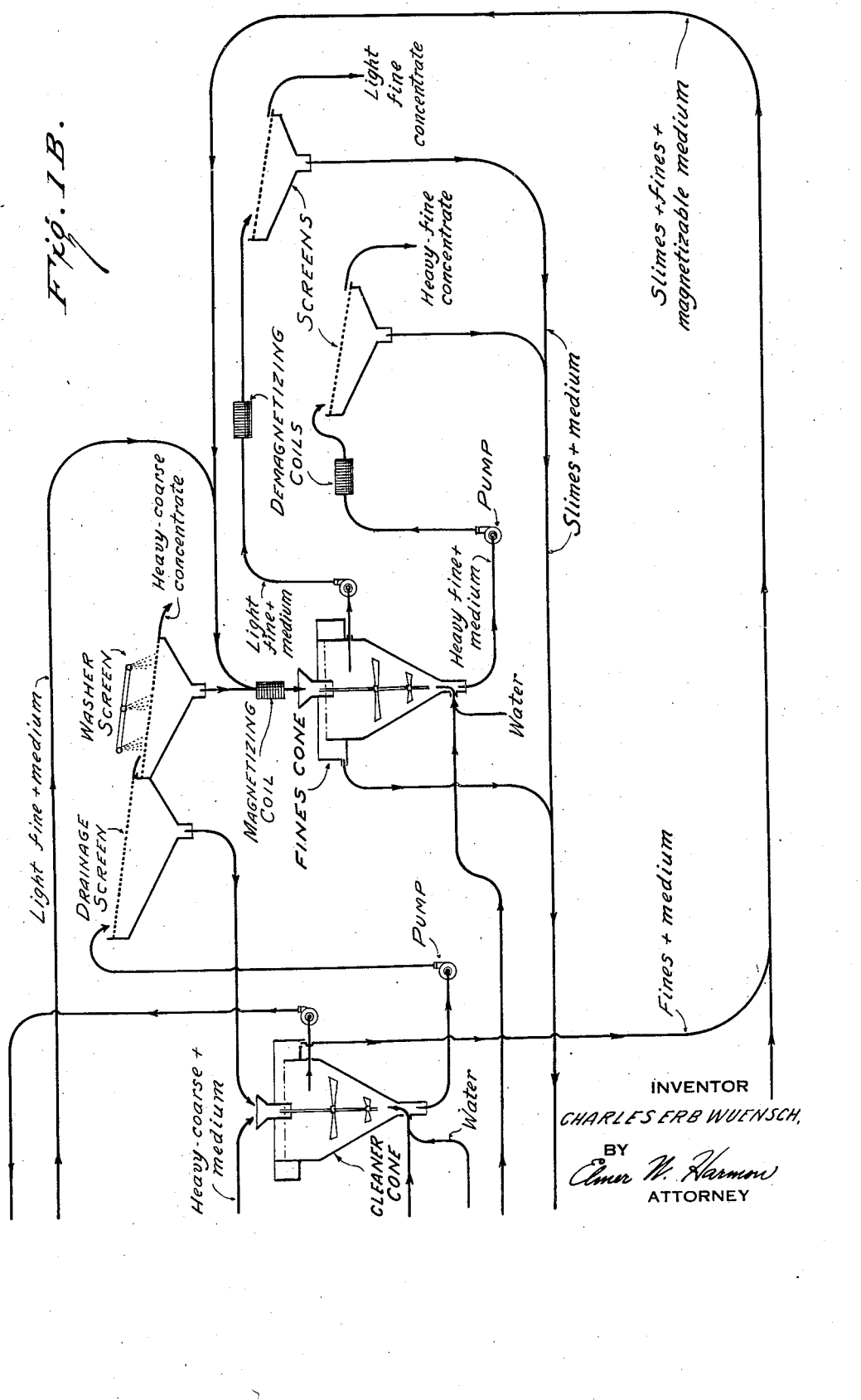

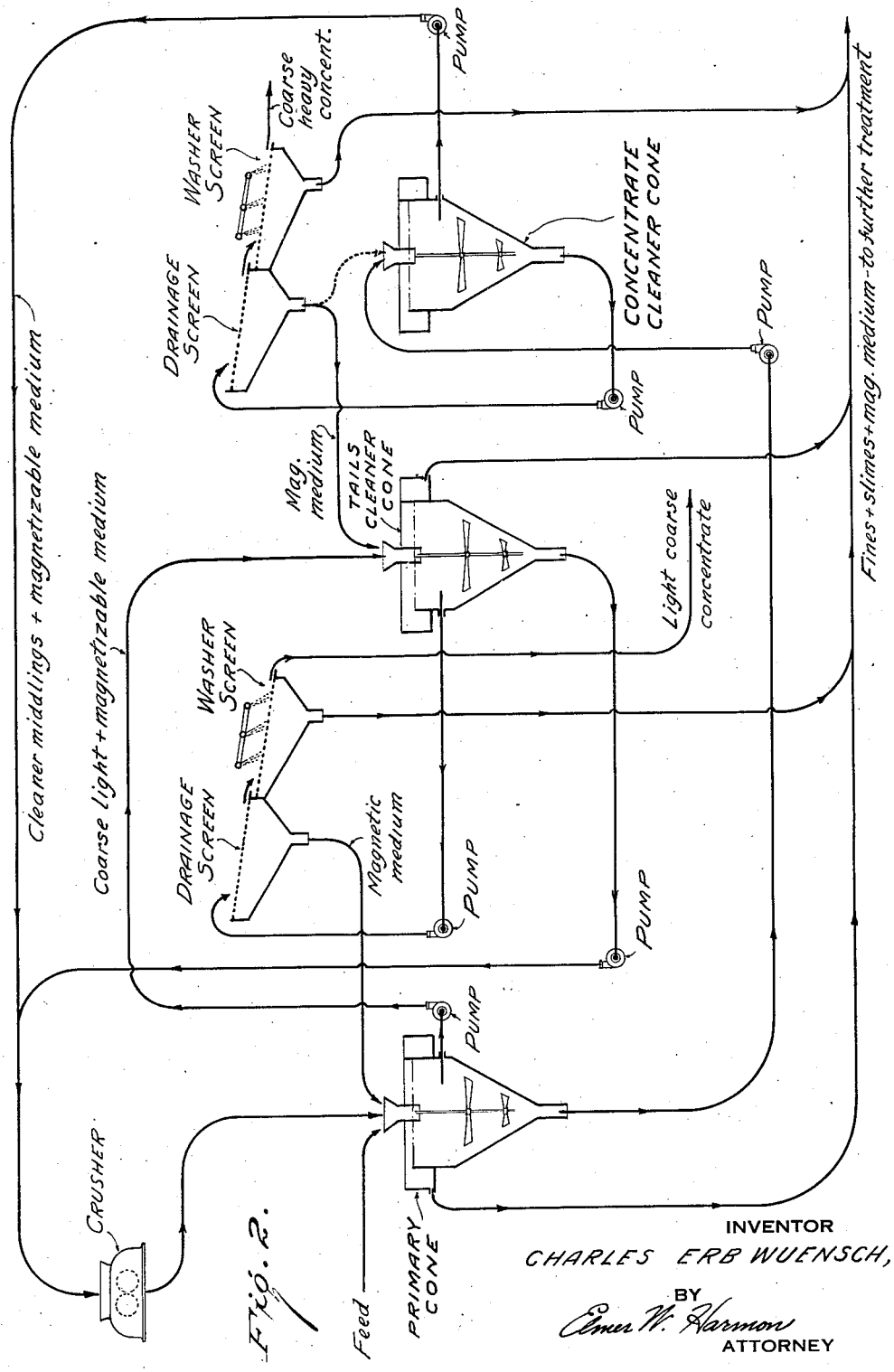

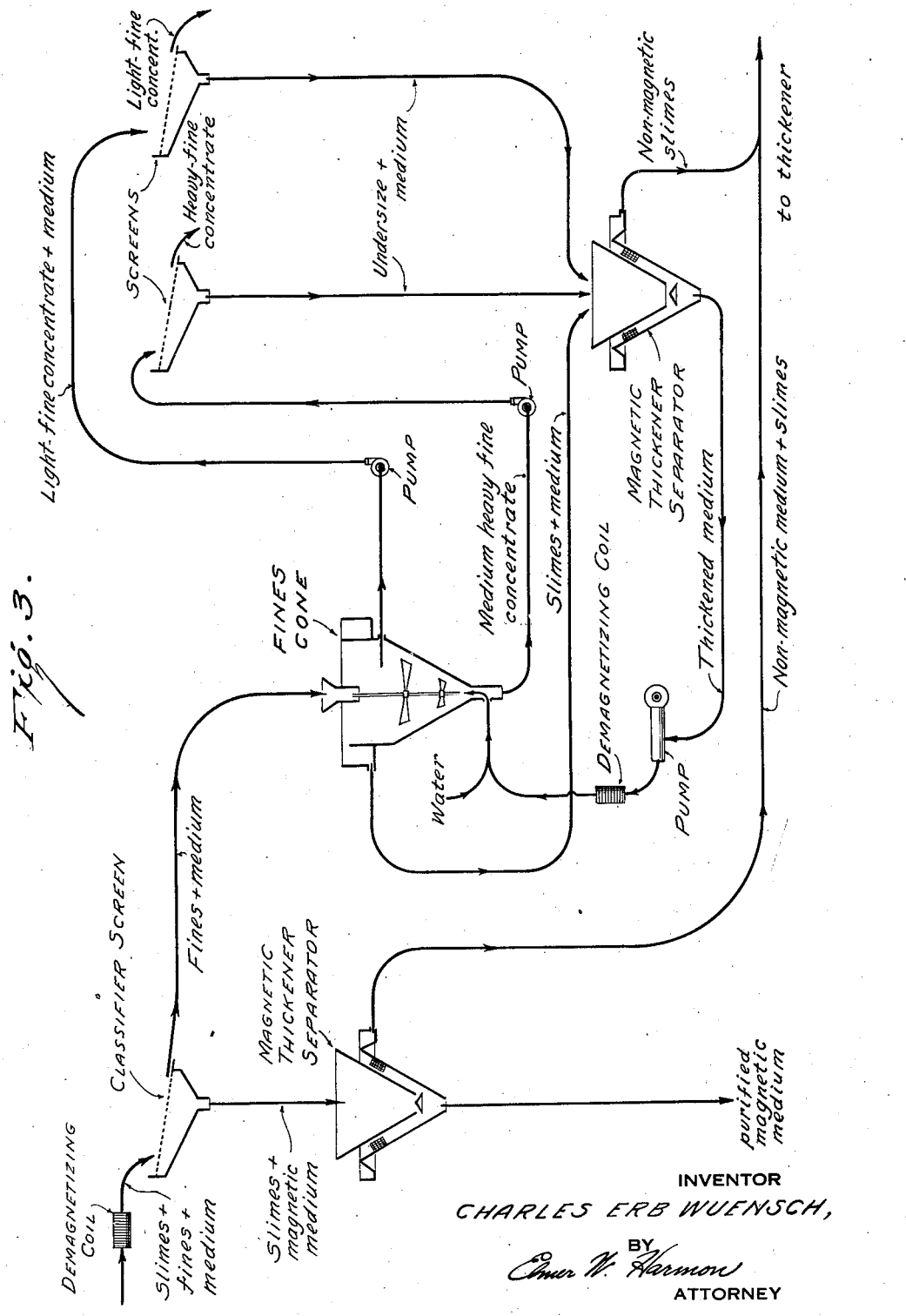

2,373,635

UNITED STATES PATENT OFFICE 2,373,635

METHOD OF SEPARATING MINERALS OF DIFFERENT SPECIFIC GRAVITY

Charles Erb Wuensch, San Francisco, Calif., assignor, by mesne assignments, to Minerals Beneficiation, Incorporated, Joplin, Mo., a corporation of Delaware Application June 18, 1943, Serial No. 491,308

7 Claims. (Cl. 241—20)

This invention relates to the separation of heterogeneous mixtures of solid particles having different densities and contemplates the provision of an improved process of and apparatus for effecting such separation. More particularly, the invention relates to an improved handling process whereby two or more solids of different specific gravities, each of which is present in widely different size ranges may be effectively separated without subjecting the mixture to an initial size grading.

Considerable interest has been shown in recent years in the so-called "sink-and-float" separation of mixtures of solid particles. This field includes a number of different processes for the separation of mixtures of materials by taking advantage of the different settling rates of particles having different specific gravities in a fluid of the proper density. Thus, in its simplest form, a mixture of two kinds of solid particles of different specific gravities when immersed in a fluid having a density greater than one solid and less than the other, separates into its component parts by the tendency of the heavy materials to sink and the lighter materials to float. Various modifications have been developed for adapting this separation for use in continuously-operating processes.

In the application of these processes to continuous operation, various liquids having a high specific gravity may be used, but the most commonly used high density fluids comprise suspensions of suitably-sized solids in water. A part of the solids are usually colloidal or semi-colloidal in size. The colloidal or semi-colloidal size particles remain suspended and in addition are capable of maintaining a certain amount of larger-sized particles in more or less permanent suspension. By properly sizing the solids and selecting them from materials having the proper specific gravity, fluids of substantially any desirable density can be prepared. It is thus readily possible to set up a continuous process for separating solids which differ in specific gravity by less than 0.1 of a point.

Industrially, the continuously-operating modifications of the process have been particularly attractive to the mining industry for use in the beneficiation of low grade ores. These processes are particularly well adapted to large-scale operation. At the same time they have a relatively low total cost per unit of product. Consequently, the use of these "heavy-media" processes has become commercially very important in this field and the practice in ore beneficiation will be taken as illustrative of the invention although the process is not necessarily so limited.

Despite the obvious advantages of these processes, they also possess certain limitations. The most serious of these limitations is the fact that from the cost standpoint they become less and less efficient as the size of the materials to be separated is decreased so that a fine feed can not be economically handled. Particularly, does this difficulty become noticeable when attempts are made to handle feed having a wide range of particle sizes. Industrially, it is ordinarily desirable to handle a feed coarser than about one-quarter inch.

The inefficiency in handling fine feed is due to a number of different reasons. First of all, the high-density fluid is of necessity carefully prepared. The cost of the solid medium is ordinarily from about $20–$125 per ton and even relatively small operations require several hundred tons in circulation. Consequently, the medium must be recovered, cleaned and reused. The presence of fine materials in the feed is troublesome because of the extreme difficulty in recovering the medium. This separation requires extensive tabling, settling and the like equipment which not only inordinately increases the fixed charges, but is even then incapable of making a good separation. The loss of medium is relatively high and is progressively higher as the amount of fines in the feed increases. Fixed charges for the original medium can not be increased beyond a certain point by replacement costs without destroying the economic advantage of the process.

Further difficulty with fine material is caused by the presence of slimes such as talc, clay, sericite, and the like, which are frequently present in ores. Since these are even more difficult to separate from the heavy fluid than are the fines of crystalline or heavier minerals and since they are usually present in low-grade ores, the treatment of which constitutes the most important application of the process, the feed must be quite thoroughly washed and deslimed. This adds still further to the operating cost, but has been considered in the art to be necessary.

Many attempts have been made to develop processes whereby the sink-and-float procedure can be applied to an unsized, undeslimed feed including both coarse and fine particles. The most successful of these have been those in which a hydraulic classifier and concentrator are operated in series, a pool of material to be treated sufficient to fill the concentrator to the overflow points being maintained in the latter. Such processes have the advantages of being able to handle much smaller feed than can be treated in a straight sink-and-float operation and of not requiring the feed to be washed and deslimed.

Even the better of these processes, however, have certain practical and economic limitations. There is always some loss of fines of the desirable mineral. In addition, these processes can not handle coarse feed economically. The coarser the feed, the greater the amount of material which must be recycled in order to obtain the necessary conditions for concentration and therefore the lower the throughput capacity. While a good concentration can be obtained with fairly coarse size feed if enough water-flow is used and enough ore is recycled, economic considerations impose a definite upper limit on the feed size. With hematite ores, for example, this upper limit is about one-quarter inch. However, the combined classifier-concentrator process is not as efficient as a straight sink-and-float concentration.

Consequently, there remained a definite need in industry, particularly in the beneficiation of ores, for a suitable process which is not subject to these limitations. A process is desired which is generally adapted to handle a coarse feed, a fine feed and/or mixtures of these and intermediate sizes. At the same time, the process must be one which is not wasteful of the high-density medium used in carrying out the separation. It is the object of the present invention to develop such a process, whereby the advantages of heavy-media separation may be obtained in the treatment of an unsized, undeslimed feed.

In general, the objects of the present invention are accomplished by using a magnetizable material for making up the high-density fluid; causing an upward flow of the high-density separating fluid during concentration and in addition, taking off an additional, intermediate, fraction instead of only the usual heavy "sink" and light "float" fractions in series treatment of the unsized ores. Preferably, but not necessarily, the medium used is a magnetizable solid.

These three initially-separated fractions are then further treated. The coarse and intermediate fractions are subsequently treated to increase further the degree of beneficiation and facilitate the recovery of the heavy media. This produces a coarse concentrate as one product and a coarse tail which may be discarded, as the other. Fines from the initial separation and the subsequent treatments are combined and treated separately from the coarser material to produce a fine concentrate and a fine tailing.

In effect, carrying out a separation process according to the process of the present invention combines the two functions of size-grading and concentrating in one operation. In practice, this procedure has a number of important advantages. It greatly increases the size range over which true concentration without classification is effective, thereby eliminating the necessity for initially size-grading the feed. It permits the advantages of heavy media-separation to be applied to mixtures including particles of relatively small size. It eliminates the necessity of desliming the feed. It permits an excellent recovery and reuse of the high-density medium and in addition, a feature which is relatively important in many districts, consumes but a small quantity of water. It eliminates the necessity for the considerate amounts of apparatus previously used in sizing the feed and in cleaning the separating medium. In addition to the direct saving by this reduction in quantity of apparatus, there is an additional saving in the direct charge for the initial amount of medium required to fill this additional apparatus.

The invention will be more fully illustrated in connection with the accompanying drawings in which:

Figures 1A and 1B delineate a flow scheme embodying the principles of my present invention;

Figure 2 shows a modification of the general flow scheme of Figures 1A and 1B, in which both the tailing and concentrate from the first separation are retreated; and Figure 3 represents an additional modification in which the fines are separated into two fractions each of which is separately retreated.

These figures are substantially self-explanatory.

The invention in its general form is best illustrated in connection with the flow scheme delineated in Figures 1A and 1B. This procedure involves the use of three separating devices which have been designated as the primary cone, the cleaner cone and the fines cone. In the drawings these have been diagrammatically represented as inverted cones, surmounted with a vertical section and provided with an overflow launder of conventional type.

This type of structure has been found to work well, but the invention is not limited to this or any specific shape of apparatus. Unsized feed is represented as being introduced through a central opening so that it is actually introduced into the fluid under the surface of the same. Again this has been found to be a preferable practice but not a limitation on the process. High-density fluid, diluted with water to the proper density, is introduced through a check valve or the like at or near the apex of the cone. However, the medium might also be introduced through a centrally-located pipe extending downwardly through the material in the separator with an outlet near the bottom of the separator.

Overflow is collected in and carried off by the previously-mentioned conventional launder. The intermediate fraction is withdrawn from the cone at a suitable point intermediate the fines overflow and the apex of the cone. Coarse, heavy material, comprising a rough concentrate, collects at the apex and is withdrawn from the bottom of the cone in the usual manner by means of pump as shown in the drawings, or bucket elevator, or an air lift, or any other suitable device for conveying the coarse heavy material and medium to the apparatus used in the succeeding parts of the present process.

Before outlining the flow scheme in detail, an examination of conditions in the separatory cones is helpful in illustrating the importance to the present invention of taking off the intermediate fraction. For purposes of illustration it may be considered that the feed comprises one material of greater specific gravity than the remainder and is to be separated therefrom. This will be referred to as the heavy portion. The high-density fluid is adjusted to a density less than that of the heavy material, so that the latter will sink, but greater than most of the remaining materials which will therefor float. The material which floats will be referred to as the light portion. Both the light and heavy material in the present discussion are assumed to be present in widely varying particle size.

In starting up the process, sufficient fluid is introduced to fill the cone. It may be assumed for the moment that there is no upward flow and that the fluid is static. Despite the fact that the fluid is prepared as a substantially permanent suspension, a slight density-differential will be formed in the cone because the larger particles of heavy medium tend to settle. The smaller particles, having a relatively large surface area for their volume, are more readily influenced by surface-tension forces and tend to remain in the upper portion. Some separation into zones will therefore occur.

If a portion of feed is now introduced, the separation into zones becomes immediately more noticeable. The heavy portion, being of a greater density than the fluid will all settle eventually. The coarser material, however, being less retarded than the fines by surface tension forces, tends to settle more rapidly. Conversely, all the light material will eventually float but the smaller particles of light material tend to rise more rapidly than the larger particles. This exaggerates the separation because the tendency, either for the heavy material to sink or the light material to float at any point within the fluid is no longer the rate in the fluid alone but the rate in a fluid containing those portions of feed which are temporarily in that zone.

These conditions are also somewhat influenced by the normal method of adding the feed by pouring it into the top of the concentrator. The smaller particles, having less inertia than the larger particles, penetrate the fluid to a lesser depth. When the initial inertia is overcome the coarser particles, whether intended to sink or float are deeper in the fluid than are the fines.

Because of these factors among others, a layer is formed at the top of the cone which is predominantly fines. Below this fines layer are zones of successively coarser light material. The converse is true at the apex of the cone, the coarse heavy material being at the bottom but surmounted by zones of successively smaller particles of heavy material. In any case, depending upon the amount of feed added, substantially equilibrium conditions will eventually be achieved.

When successive additional portions of feed are added, after the initial feed has come to equilibrium, the freshly added particles move horizontally, due to the resistance of the particles already in suspension, as well as vertically because of the tendency to sink or float. This horizontal movement is more pronounced than is the vertical movement. One of its most noticeable results is the production of the tight crust or mat of floating fines which is observed at the top of the fluid of conventional sink-and-float operations if attempts are made to operate them on an ungraded feed. Coarser particles of light material must force their way through this mat before they overflow. The influence of this horizontal movement packs these upper layers into a tighter and tighter crust. This in turn increases the tendency of the particles in the immediately lower layers to move tangentially outward more readily than they move vertically.

Another result produced by these various factors and which is equally troublesome but less apparent to the eye, is the decreased sharpness of separation. The tendency of the smaller particles to sink more slowly than the coarse has been noted. Similarly, note was taken of the fact that the particle-supporting ability of any one zone is not that of the high-density fluid alone but that of the fluid plus the additional solids in that zone. Consequently, intermediate zones in the fluid may contain not only coarse materials which are rising or settling but also smaller particles of light-material which are more rapidly rising, smaller particles of heavy-material which are falling more slowly and still smaller particles of heavy-material which settle very slowly or may be even substantially suspended. The result is a slower separation.

As the specific gravities of the heavy materials, fluid and light materials approach each other the difficulty is more and more pronounced. Obviously, too, it is exaggerated as the range in particle size of each material in the feed is extended, particularly in the smaller sizes. If the size ranges are great enough and the different gravities are close enough, fine heavy-material may be carried out in the overflow. Ordinary sink-and-float operations must avoid these conditions, by using a washed, sized feed, preferably coarser than one-quarter inch.

Introducing an upward flow of fluid and a continuous feed alters these conditions by changing the relative level at which the different particles come to equilibrium. However, the tight crust which was mentioned above continues to form and to interfere with the free overflow of the float portions. The coarser light materials continue to move horizontally in a tangential path more rapidly than they move upwardly due to the tendency to float. The falling rate of the fine heavy material is further decreased and the amount carried out in the overflow is increased. As in the cone illustrated in Figure 1A, and in most conventional separatory apparatus, the horizontal cross-section of the apparatus gradually is enlarged and the upward velocity of fluid-flow progressively decreases so that it has less available force to carry the coarser portions of light material. This also aids formation of the objectionable tight crust.

It is this separation into zones, with the resultant formation of a floating crust, which has been one of the drawbacks in applying sink-and-float separating to materials of widely varying particle size. In the present invention this objection has been turned to advantage by recognizing the importance of the horizontal, tangential particle movement of the coarser light material. This tangential motion is aided by the operation of the revolving sweeps which are used in many sink-and-float operations, including that of the present invention.

Provision is made in the present invention for removal of the horizontally moving layers of the coarser light-material at a point below that at which the crust forms in conventional operations. This may be done through a single outlet or by a conventional manifold arrangement. Being conventional in design, and the present invention not being limited to any particular device for taking off this intermediate fraction, this take-off has not been specifically illustrated. Figure 1A merely indicates a take-off through which the intermediate fraction is removed by a centrifugal pump, an air lift or some similar device.

In actual operation the exact heighth in the apparatus at which this intermediate fraction is removed is fairly important. It should be low enough so that it does not include appreciable amounts of light fines and slimes but high enough so that it will not contain appreciable amounts of heavy fines. For ease in actual operation, it is useful to have this take-off point adjustable. Taking off this intermediate fraction at this point produces a concentrate of light material which is ordinarily sufficiently clean to be discarded after draining and washing the high-density medium therefrom, as shown in Figures 1A and 1B.

Overflow of fines and slimes, including medium in addition to the usual overflow over the periphery of the cone, is also over a specially provided weir (rather than over the entire periphery of the apparatus). This weir, which is preferably although not necessarily adjustable in heighth, produces dewatering of the uppermost zones and thereby prevents formation of the objectionable floating mat which would otherwise tend to form. As a result, a density-differential is created in the upper zone in which the crust usually forms. For example, where a medium having a specific gravity of about 2.7, is being used, the density-differential between the top of the fluid and the point where the intermediate fraction is withdrawn will increase from about 1.05 to the requisite 2.7. This aids in making the intermediate fraction a clean discard. The finer gangue particles, capable of floating in a medium of lesser density, are permitted to do so and are therefore more mobile. The whole tendency to form a tight crust is thereby greatly reduced.

Again, considering the flow scheme found in Figures 1A and 1B, the overflow from the primary cone which contains slimes, fines and medium is pumped to the fines cone. The intermediate fraction is pumped to a drainage screen. In passing over the screen the medium drains from the coarser particles of light gangue and is returned to the primary cone. Gangue particles are carried down over a washer screen and after washing are passed to waste. Wash water from this screen, containing the small amounts of medium and fines, is joined with the overflow from the primary cone as part of the feed to the fines cone.

The rough concentrate which is removed through the apex of the cone by a pump, or air lift, or like device, is retreated in a cleaner cone. The intermediate fraction from this cleaner cone, designated as middlings, is pumped to a set of crusher rolls, or other size reduction apparatus, and returned with the feed to the primary cone. The heavy concentrate from the cleaner cone is also passed over a drainage screen and the medium which drains therefrom is returned to the cleaner cone. After passing over the drainage screen, the heavy material passes over a washer screen and it is taken therefrom as coarse product. Wash water, including any fines and medium, is mixed with the overflow from the cleaner cone, and comprises additional feed to the fines cone.

Feed to the fines cone thereby comprises four portions: overflow from the primary cone; overflow from the cleaner cone; underflow from the primary cone washing screen and underflow from the cleaner cone washing screen. It contains substantially all the slimes and fines from the original feed and considerable amounts of the solid, magnetizable material of the high-density fluid. Immediately preceding introduction into the fines cone, the feed is passed through a magnetizing coil. The resulting partial flocculation assists in carrying out an effective separation.

This modification is shown in Figures 1A and 1B and is one of the advantages of using a magnetizable medium in the present process. However, the magnetic flocculation which occurs in this cone must not be confused with the magnetic cleaning used in the art for the recovery of the medium. Both are mutually exclusive. In the present process, magnetizing the material is important in many cases to obtain thorough separation of the light and heavy particles whereas in the conventional magnetic cleaning thorough demagnetization is essential after cleaning or the process is inoperative.

The intermediate fraction from the fines cone which comprises essentially light fines and medium is pumped through a demagnetizing coil and passed over a screen. Oversize therefrom comprises clean fine light material. Underflow from the fines cone, comprising essentially heavy fines and medium, is also pumped through a demagnetizing coil and over a screen. The oversize from the latter comprises a clean, fine-heavy concentrate.

Undersize from both the light-fines and heavy-fines screens, containing essentially slimes and medium, is mixed with the overflow from the fines cone, which also contains essentially the same materials, and is passed to a magnetic thickener-separator. This thickener may be any desired type, the present process not being limited to any particular apparatus.

The thickener overflow comprises essentially water, slimes and a very little non-magnetizable fines. This is passed through a filter which recovers a substantial proportion of the water for reuse and converts the non-magnetizable slimes and fines to a thickener sludge. The latter can be passed directly to waste but may be further processed in some way if so desired. Underflow from the thickener comprises essentially a thick sludge of the magnetizable material or medium which constitutes the solids portion of the high-density fluid. This thickened sludge is passed through a demagnetizing coil and is recirculated for use in the various cones.

Figures 1A and 1B show the magnetic medium circulation system to comprise a battery of pumps. The exact arrangement of this part of the flow scheme does not form a limitation on the present process but is merely intended to set forth one system which has been found to work well. As shown in Figure 1A, demagnetized, magnetizable-medium is passed to a battery of parallel pumps. One particularly useful form is a piston-diaphragm pump.

These diaphragm pumps are particularly well-suited for use in the instant set up since the pulsating flow assists the separation of a clean intermediate layer. The invention, however, is not necessarily limited to their use and they may be replaced by other standard pumps if so desired.

From these pumps, one of which is provided for each of the separatory cones, the magnetic medium is recirculated and introduced into the cones at the apices thereof. Immediately prior to reintroduction into the cone, sufficient water is admixed with the magnetizable medium sludge to bring it to the proper fluid density. Preferably, although not necessarily, this dilution is automatically controlled in order to insure uniform operation. Suitable apparatus for performing this automatic control is commercially available.

Figure 2 shows an alternative flow scheme which is specially adapted to those cases in which a particularly delicate separation is required. This alternative circuit differs from the flow scheme shown in Figure 1A in that the primary cone does not directly produce any product. The intermediate fraction of the primary cone is passed to a tailing cleaner cone and it is the intermediate fraction therefrom which is screened and washed to produce a finished coarse light fraction.

The coarse heavy fraction from the primary cone is fed to the concentrate cleaner cone. The coarse heavy fraction from this latter cone is screened and washed to produce a clean product and the intermediate fraction is passed through a crusher and returned to the primary cone. It should be noted that this alternative circuit produces only one heavy product concentrate rather than separate coarse and fine concentrates of Figures 1A and 1B. Overflows from all three cones are combined with the washings from the screens and passed to a magnetic separator as in the flow scheme of Figures 1A and 1B. For purpose of clarity, the flow circuit for the high-density fluid has been omitted in Figure 2. It should be noted, however, that the oversize from the heavy product drainage-screen contains magnetizable medium which is returned alternatively either to the tailing cleaner cone or to the concentrate cleaner cone as is required to maintain the fluid level.

In Figure 3, a special arrangement is provided which separates the feed to the fines cone into two size bands by passing them over a screen. The undersize is passed to an additional thickener and the oversize constitutes the feed to the fines screen as in the circuit of Figures 1A and 1B. Except for the addition of the screen and the extra thickener, the remainder of the circuit is like that of Figures 1. However, in Figure 3, the magnetizable medium from the fines cone thickener is directly recycled, and magnetic medium for the primary cone and cleaner cone is obtained from the thickener which treats only the fines screen undersize.

For the concentration of ores which require fluid densities from about 2.8 to 3.2 one of the most readily available magnetizable materials for making up the suspensions is the finely comminuted attrition products derived from grinding iron or iron alloys in a ball-mill circuit. They may be recovered and blended with finely divided artificial or natural magnetite.

Some of these materials tend to oxidize quite badly. If so desired they can be protected from corrosion by adding suitable protective compounds such as a soluble salt of bismuth, lead or mercury or the like. It may also be done by imposing an artificial E. M. F. to offset that which is set up by the interaction of the dissimilar materials. This may be carried out by any of several well known methods.

Where higher densities than about 3.2 are required, various materials may be used. Gravities as high as 4.0 to 4.5 may be obtained using comminuted Heusler's alloys (60% copper, 26% manganese and the balance aluminum, zinc, lead, etc.) may be employed. For still higher densities up to about 5.5, iron amalgams may be used.

Where suspensions having a gravity less than about 3.2 are satisfactory, there is wide range of materials which may be used. Among these, for example, are such materials as roasted chalcopyrite, bornite, lollingite, arsenopyrite and pyrrhotite; or wolframite, magnetite, franklinite, ilmenite, also ferrosilicon and many other of the well known commercial iron alloys.

I claim:

1. A process of separating particles of a heavy material having a known specific gravity from an unwashed, unsized mixture containing light particles of lesser specific gravity, said materials being present in widely varying particle size and at least one of the materials including fines, which comprises the steps of introducing the mixture into an upward-rising fluid mass comprising a finely-comminuted, magnetizable, solid medium suspended in a liquid and having an apparent density between those of the particles to be separated; overflowing the fine float fraction which rises and tends to accumulate as a mat near the top of said fluid; withdrawing a coarse-light fraction from a level below that at which the fine float is overflowed but sufficiently high to insure substantial freedom from heavy particles of sufficient mass to have a more rapid rate of fall; draining said fraction and washing the drained material, whereby a clean coarse-light concentrate is produced; withdrawing the sink fraction which settles to the bottom of the fluid; immersing the sink fraction in a second upward-rising fluid mass having an apparent density only slightly less than that of the heavy particles; withdrawing the heavy fraction from the bottom of said second fluid, draining said fraction and washing the drained material, whereby a coarse-heavy concentrate is produced; overflowing a second fine float fraction which tends to accumulate near the top of said second fluid; combining the two overflow fractions and the two wash waters, whereby a product containing substantially all the fines together with medium is produced; withdrawing a second coarse-light fraction from a level below that at which the second float fraction is overflowed but sufficiently high to insure optimum freedom from heavy particles; crushing said fraction and introducing the crushed material along with fresh feed into the first fluid mass.

2. A process according to claim 1 in which the tendency of the fine float materials to form a compact floating mat is effectively overcome by producing a density gradient in those uppermost layers of the fluid mass in which the fine float materials accumulate.

3. A process according to claim 1 in which the drainings from the first coarse-light fraction are reintroduced into the first fluid mass.

4. A process according to claim 1 in which the drainings from the heavy fraction withdrawn from the bottom of the second fluid mass are reintroduced into said second fluid mass.

5. A method according to claim 1 in which the first coarse-light fraction is introduced into a third upward-rising fluid mass having an apparent density slightly less than that of the light particles; a third float fraction is overflowed and combined with the first and second overflow fractions; the coarse fraction which settles to the bottom of the mass is withdrawn and combined with the second intermediate fraction before the latter is crushed; a third intermediate fraction is withdrawn below the level at which the float fraction is overflowed; this fraction is drained and washed whereby a clean, light, coarse concentrate is obtained and the washings are added to the combined overflow fractions.

6. A process according to claim 1 comprising in addition the steps of passing the combined product containing the fines through a magnetizing coil, whereby the medium therein becomes magnetized, introducing the magnetized material into a third upward-rising fluid mass having a density between those of the materials to be separated; overflowing a third float fraction which contains substantially all the slimes; withdrawing a third sink fraction containing substantially all the fine heavy particles; passing said fraction through a demagnetizing coil and screening the demagnetized material whereby the medium is removed therefrom and a fine-heavy concentrate is produced; withdrawing a third intermediate fraction from a level below that at which the fines are overflowed but sufficiently high to insure substantial freedom from fine heavy particles; passing the third intermediate fraction through a demagnetizing coil and screening the demagnetized material whereby substantially all the medium is removed therefrom and a fine-light concentrate is produced.

7. A method according to claim 1 in which the overflow from said third mass is magnetically treated to recover the finely comminuted magnetizable material therein as a thickened sludge, further treated to demagnetize the magnetizable particles, diluted after demagnetization and recycled to make up the magnetizable material carried from said fluid mass in withdrawing said fractions therefrom.

CHARLES ERB WUENSCH.